May 29, 1923.
B. E. ELDRED
1,456,590
PROCESS OF MAKING HALOGENATED PRODUCTS
Filed Feb. 8, 1917
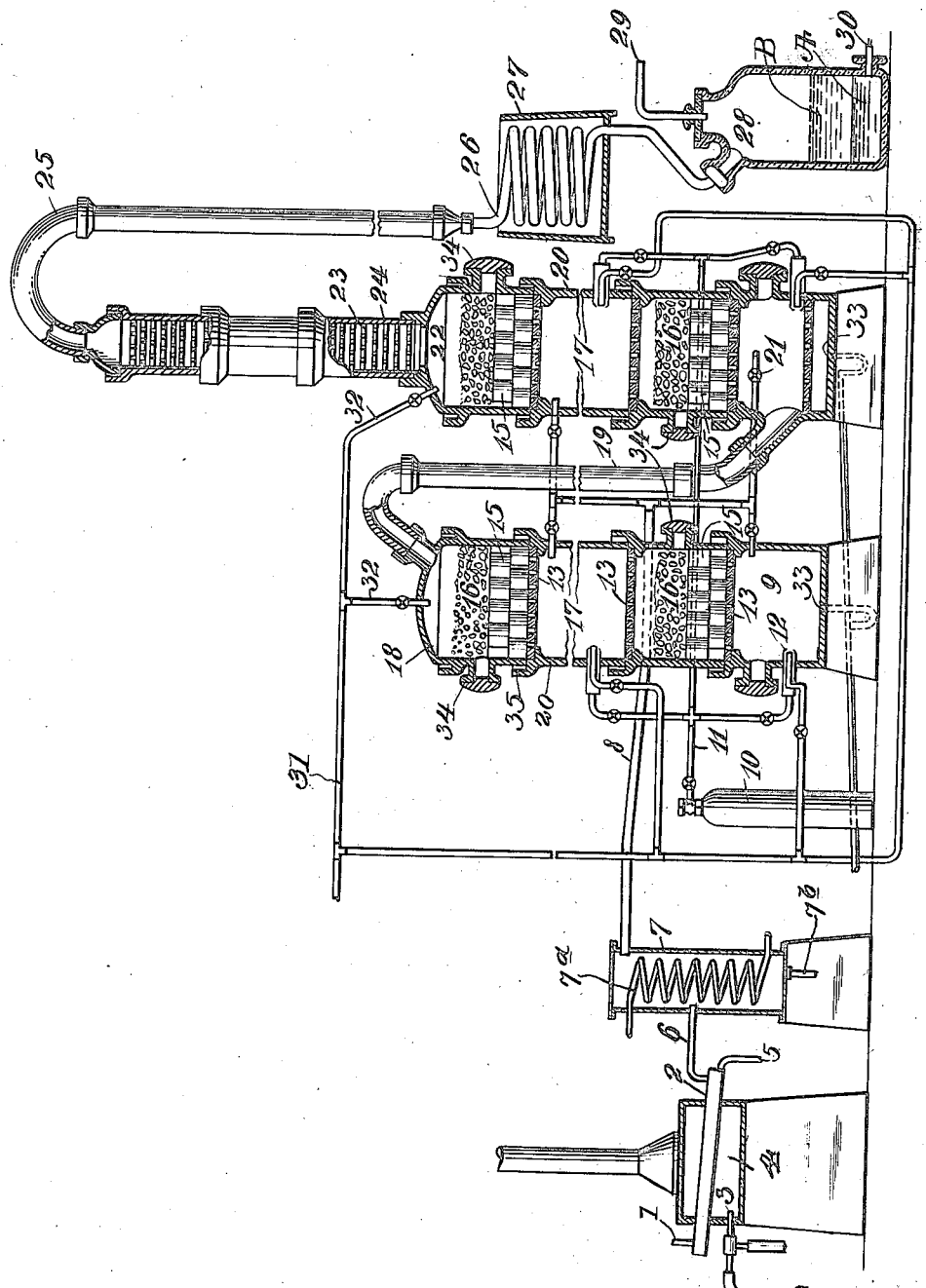
Inventor
Byron E Eldred
By his Attorney
K.P. McElroy Patented May 29, 1923.

1,456,590

UNITED STATES PATENT OFFICE.

BYRON E. ELDRED, OF NEW YORK, N. Y., ASSIGNOR, BY MESNE ASSIGNMENTS, TO CARBIDE AND CARBON CHEMICALS CORPORATION, A CORPORATION OF NEW YORK.

PROCESS OF MAKING HALOGENATED PRODUCTS.

Application filed February 8, 1917. Serial No. 147,461.

*To all whom it may concern:*

Be it known that I, BYRON E. ELDRED, a citizen of the United States, residing at New York, in the county of Queens and State of New York, have invented certain new and useful Improvements in Processes of Making Halogenated Products, of which the following is a specification.

This invention relates to processes of making halogenated products; and it comprises a method of reacting upon unsaturated gaseous hydrocarbons with chlorin in the presence of steam to produce the bodies known as chlorhydrins, wherein a continuous current of gases, vapors and steam is established and maintained in and through one or more vertical reaction chambers, passing therefrom to condensing means, such current being formed initially of steam, oil gas and chlorin and receiving at intervals during its passage successive further additions of chlorin and of oil gas, whereby the same steam serves as a diluent means in a successive series of reactions between chlorin and oil gas; all as more fully hereinafter set forth and as claimed.

In breaking up petroleum oils, such as solar oil, gas oil, petroleum residuum, wax-tailings, kerosene, crude oil, etc. by heat, an oil gas may be obtained which is relatively rich in unsaturated compounds; frequently going as high as 50 per cent of total unsaturated gaseous hydrocarbons (bromin absorption). For the most part these unsaturated gases are olefins, being mainly ethylene and propylene with small amounts of the butylenes. Good gas for the present purposes may be made by passing such an oil through a retort heated to 700° C. or thereabouts. Higher or lower temperatures may be employed; this depending somewhat on the apparatus, the rate of oil feed, etc. Operation may be under extra pressure or under reduced pressure. Ordinary atmospheric pressure works well. It is desirable to pass the oil through the gasifying zone at a rate rather more rapid than the rate of gasification, i. e. so that more or less ungasified oil passes through; and then quickly cool the issuing gas. The excess of oil condenses and separates as a fog of fine suspended droplets and serves as an effective scrubbing means for removing non-gaseous volatile hydrocarbons, such as gasoline, etc. Further purification, such as treatment with oxid of iron, etc., may be resorted to removing sulfur and other impurities. The olefins of oil gas readily enter into reaction with chlorin, and with proper regulation of conditions the reaction is not explosive or destructive. The products which are formed depend however upon the conditions. Taking ethylene as typical, one product which may be formed is what is known as ethylene dichlorid or "Dutch liquid," $C_2H_4Cl_2$. Propylene and the butylenes form similar materials which may also here be called, for the sake of a name, Dutch liquid. In practice, some moisture or other catalyst appears to be necessary for producing the reactions which lead to the production of Dutch liquid; and particularly with ethylene. The olefin dichlorids, or "Dutch liquids" are heavy oily bodies which are insoluble in water and are of value for solvent purposes, being good solvents of fats, oils and waxes. While as stated, chlorin and the olefins of oil gas in the presence of some moisture will form Dutch liquid, it has been found that if the proportion of water (as vapor) in the sphere of reaction be materially increased quite another reaction takes place: the production of what are known as chlorhydrins. The chlorhydrins of the gaseous olefins differ from the olefin dichlorids in that they are soluble in water and contain less chlorin. Ethylene chlorhydrin for example is $C_2H_4OHCl$. It will be observed that it differs from ethylene chlorid not only in containing less chlorin but also in that it contains .OH, derived from the water present and taking part in the reaction. Attendant upon the chlorhydrin forming reaction is the production of HCl or hydrochoric acid. Half the chlorin used reappears as chlorhydrin and half as HCl. In practice in the operation of making chlorhydrin, utilizing the described reaction it is found that as HCl accumulates in the zone of reaction the tendency towards the production of chlorhydrins lessens while the tendency to the production of the olefin chlorids increases. This is undesirable for the reason that although the olefin chlorids are technically valuable materials yet they are not as desirable as the chlorhydrins. The chlorhydrins are not only valuable as solvents for resins and other coating materials but have the further value of being materials from which a wide variety of other useful products may be readily made, as for instance glycols, acetates, formates, butyrates, benzoates, etc. The possibility of an economical production of glycols, which may be utilized for the purposes for which glycerin is now used, renders the manufacture of chlorhydrin particularly important. The chlorhydrins of oil gas all have nearly the same boiling point and the mixture produced in the present process, for technical purposes, is practically a unitary substance. In a dry condition they boil between 125–135° C., while in the presence of water their boiling point is several degrees below 100° C. This latter fact is utilized in the present invention.

In the manufacture of chlorhydrins by interaction of chlorin, oil gas and steam, it is found that a relatively large amount of steam is necessary to dilute the gas and chlorin and insure a good production of chlorhydrins and a corresponding restriction of the production of Dutch liquid.

In the present invention I have devised a method of performing the stated reaction wherein substantially the same steam is used for diluting successive mixtures of gas and chlorin. In this method I employ a vertical reaction chamber and pass into it at its base steam, together with some oil gas and some chlorin. The olefins of the oil gas and the chlorin interact (together with some steam) and disappear and the vapors produced take their place. The time given for this action may or may not be sufficient for a nearly complete disappearance of the chlorin. Into the same current of steam which now contains chlorhydrins, I add a further portion of chlorin and one of oil gas. They may be added together but I find it better to add them in succession, first the chlorin and then the oil gas. I may continue this portionwise addition of reactive gas and reactive chlorin, with a pause between each addition or, which is the same thing, with a flowing current making the additions at spaced points along the path of the current, until the proportion of chlorhydrin vapors to the steam is a maximum which may be determined by tests of samples. When once determined for a given size of apparatus, the plant may thereafter be run in the same general way. At this time I pass the current of mixed vapors through a condenser to condense and recover the vapors. In practice I find that with an apparatus of convenient size an addition of four or five successive portions of gas and of chlorin to the same gas-vapor mass may be made, although it is within the limits of the present invention to use a greater or less number of successive additions. I regard this invention as covering any process wherein oil gas, steam and chlorin are allowed to react and prior to any condensation of the chlorhydrins, from the mass of gases and vapors, a further reaction between newly added chlorin and oil gas is produced in the same mass or body; that is in the presence of the same steam which served for dilution and reaction with the first addition of gas and chlorin. By cutting down the amount of steam I can increase the amount of Dutch liquid formed. Or by running the whole apparatus rather hotter and diminishing the amount of condensed steam formed, which increases the amount of HCl in the vapor form, I can also increase the production of Dutch liquid. The proportion of chlorhydrin and of Dutch liquid which I may wish to produce depends upon economic conditions. Both are valuable solvents and of economic value. But I ordinarily desire to increase the chlorhydrin at the expense of the Dutch liquid for the reasons stated ante.

In the stated reaction as already noted, the presence of HCl in the zone of reaction is undesirable and since it forms in the reaction itself, means must be provided for removing it. Such means may be water condensed from the steam added and in this event I may desire to add small further replenishing additions of steam to the current of reacting gases and vapors in their passage through the apparatus. Such additions of steam are convenient in any event, and particularly in introducing the chlorin; not only because the chlorin must be diluted with the steam but because, using the steam as an injecting means, it allows using chlorin in the chlorin line under less than atmospheric pressure by reason of the sucking action of the injector. This is particularly convenient in using chlorin directly from electrolytic cells, such cells being ordinarily run under suction to avoid nuisance. Usually the cells are run hot, say at about 80° C., and where hot moist chlorin can be taken directly from the cell and used in the present invention it is advantageous as economizing both heat and steam. The cells may with advantage be run hotter than is the usual practice, even up to 100° C. since this lessens their resistance while the more water vapor comes forward with the chlorin the better for the present purposes.

The HCl which forms in the vapor current as a result of the chlorhydrin reaction may be removed in other ways than by simple washing out with condensed water. One such way which has proved convenient in practice is described and claimed in a copending application of one J. M. Moness and, broadly stated, consists in maintaining in the sphere of reaction solid manganese dioxid or other material capable of reacting with HCl to oxidize such HCl and liberate chlorin. In so doing not only is the HCl removed but half its chlorin is regained for use in the reaction. As already noted, in the production of chlorhydrins from oil gas and steam only half the chlorin reappears in the chlorhydrin, the other half forming HCl. By the use of $MnO_2$ half of this HCl is regained as chlorin. This expedient may be advantageously used in connection with the process of the present invention; but is not necessarily so used. When used, I customarily pass the reaction mixture after each successive addition of chlorin and of gas into contact with granular manganese dioxid. Instead of using the granular manganese dioxid, a suspension of Weldon mud or the like may be employed with suitable apparatus permitting transmission of such suspension through the same as a countercurrent. The reaction of the HCl on the manganese dioxid forms manganese chlorid which dissolves in the water condensing from the steam and drains away. Advantageously I intercept the manganese chlorid solution formed in later stages in the course of the path of the mixed gas and vapor current and remove it without forcing it to pass in a countercurrent against the whole current of gases and vapors. Where using granular manganese dioxid it has another function than the chemical one just stated in that it acts as a scrubbing and mixing means. The gases and vapors forced to pass between the granules are effectively mixed and the layers of liquid on the surface of the granules give a good scrubbing action. Other granular materials which are chemically inert may be used in lieu of the manganese dioxid granules in securing this scrubbing result.

In the accompanying illustration I have shown more or less diagrammatically, partly in vertical section and partly in elevation, an apparatus adapted for use in the operation of the described process.

In this showing, 1 is a pipe leading from a suitable source (not shown) of oil or the like to be gasified. The oil is fed into retort 2 which is kept at a suitable temperature by oil burner 3 in furnace chamber 4. Any unvaporized oil passing through the retort may be led away by drip 5 and collected for return. The gas produced in the operation passes through 6 into cooling and quieting chamber 7. In practice it is best to run the gas making operation so that a considerable amount of unchanged oil vapors remain in the issuing gas. On cooling in this chamber the oil condenses and forms a fog which serves as an efficient scrubbing means for removing any gasoline, etc. which may be in the gas. To assist in quick cooling this quieting chamber may be provided as shown, with cooling coil 7ª. Oil condensing is withdrawn by drip 7ᵇ. Cooled and settled gas passes from this tank through pipe 8 provided with a number of valved branches allowing communication with a reaction chamber or chambers at a plurality of points. As shown, the reaction chamber is made in two sections or sub-towers side by side each comprising a plurality of sub-chambers and so connected as to form one continuous chamber in operation. These sub-chambers are alternatively, as shown, unobstructed and provided with mixing and scrubbing means. In this apparatus, the lowermost unobstructed sub-chamber, or the one in which the initial mixture is made, is designated as 9. A suitable source of chlorin, here shown as a chlorin tank 10, communicates with a chlorin main 11 which has a number of valved branches allowing introduction of chlorin into the reaction apparatus at a plurality of successive points. As shown, chlorin may be blown into the apparatus at each of these points through a steam injector 12. Spanning the reaction chamber at various points along its length are perforated cross plates 13 which serve in securing thorough admixture, unobstructed mixing chambers occurring between each alternate pair of these cross plates 13. The alternating sub-chambers may here be called oxidizing chambers. Mounted on alternate plates are further mixing devices 15 which as shown are two sets of simple annuli mounted out of alignment. Upon the top annuli rests a layer, 16, as shown, of granulated manganese dioxid or other granular material which may or may not have a chemical function. Between these sections, which may be called oxidizing sub-chambers, are the unobstructed sub-chambers 17. As shown, the portion of the reaction chamber or sub-tower through which the current of gases and vapors first passes is closed off at the top by dome 18 through which passes a conduit 19 leading the gases and vapors to the base of the companion and continuing reaction chamber or sub-tower. The first sub-tower may be designated as a whole by 20 and the second as 20'. 20' is exactly like the first sub-tower. The unobstructed chamber at its base is designated as 21. At the top of the tower is an unobstructed chamber 22 with which communicates a sort of reflux arrangement 23 provided with perforated cross shelves 24. This serves to condense and return a portion of the excess of steam going over. The somewhat cooled gases and vapors pass through 25 to condenser 26 in tub 27. Uncondensed gases and condensed liquids pass on into receiver 28 from which gases may be led to exit through 29 while condensed liquid is withdrawn at 30. Steam for the system is provided from main 31 having a number of branches at various points 32. Condensed water holding in solution manganese chlorid, if the layers of manganese dioxid mentioned are used, but otherwise holding in solution HCl, may be withdrawn through traps 33. Two of these traps are shown allowing each of the sub-towers to be drained separately. Where manganese dioxid is employed the layers in the reaction chamber may be replenished from time to time through hand holes 34. The sub-towers may be made of a plurality of sections connected by flanged unions 35 in which may be placed any suitable lute. As shown, the condensate in this receiver is condensed into two layers, a lower layer A and an upper layer B.

In the operation of the above apparatus, the gas which is made in 2 (there may be a number of these retorts operating in parallel) is taken through 6 and cooled and freed of oil vapors in 7. A portion of the gas is led by a branch of pipe 8 into the lowermost unobstructed sub-chamber, or the first in order, 9. Here the gas meets with chlorin from a branch of pipe 11 and steam from 31. As shown, steam and chlorin are introduced at a lower level than gas. The steam, gas and chlorin are thoroughly intermixed and reaction begins. Admixture and reaction are perfected by passage of the current through the perforations of 13, the staggered annuli 15 and the granular layer. As the reaction with the production of chlorhydrin progresses, HCl is formed. Where layers 16 of manganese dioxid are employed, this HCl is there oxidized and converted into water and free chlorin, this free chlorin in its turn reacting with the olefins. The manganese chlorid dissolves in condensing water and is drained away through 33. Where another granular material is substituted for the manganese dioxid the HCl produced is dissolved or taken up by condensing water and escapes as an acid solution in the same way. Where manganese dioxid is not employed, layer 16 may consist of broken glass, broken stoneware, quartz fragments, etc. serving as a mixing and scrubbing means. As the chlorin and olefins react they tend to disappear and are replaced by vapors of chlorhydrins; the whole apparatus being at a temperature (95°–100° C.) such that the chlorhydrins remain in the vapor form in the presence of the steam. The desired temperature is readily maintained by the use of steam of the temperature and quantity requisite for carrying out the process. The mixed gases and vapors passing the first granular layer then pass through another plate 13, which serves for a further mixing action, and enter another open or unobstructed chamber 17. Here another portion of chlorin is added from a branch of pipe 11 and another portion of gas from a branch of pipe 8. More or less steam may be added also at this point by the steam injector shown. The gas current which now contains further chlorin and olefins passes once more through a plate 13, then through the mixing annuli and the layer 16 of manganese dioxid or other active or inactive fragmentary material. Water of condensation containing HCl or manganese chlorid, as the case may be, from this chamber passes downward and escapes at the same trap 33. The gases and vapors are now led through cross-over 19 into another unobstructed chamber 21 where a further portion of chlorin is added from another branch of pipe 11. If desired further steam may be added through 32 to maintain the heat and dilution in the passage through the cross-over. More chlorin is now introduced with a little steam from a branch of pipe 31. Gas is introduced from a branch of pipe 8. The chlorin and gas so introduced are mixed with the vapors in passing through the perforated cross plate and the staggered annuli, and passing thence through fragmentary material 16. A further portion of chlorhydrins is produced. The gases and vapors now pass through another perforated cross plate into the unobstructed space 17 where more chlorin and gas, and if desired more steam, are introduced. The mixture now passes through a cross plate, staggered annuli and fragmentary material as before. If desired a little more steam may be added through pipe 32. The HCl solution or manganese chlorid solution, as the case may be, drains through the whole chamber 20′ to trap 33. The mixture of gases and vapors passes upward through 24 and is partially refluxed and fractionated with the aid of cross plates 23. Condensed liquid drains back into the sub-tower 20′. A low boiling mixture of vapor passes through 25 to the condenser 26. In 28 the two layers shown, A and B, may be of condensed Dutch liquid and watery solution of chlorhydrins or A may be a layer of condensed chlorhydrins and B a saturated solution of the same.

As will be evident, the present invention comprises establishing and maintaining a body or mass of steam (which in practice is a flowing mass or current) and adding chlorin and gas to the body portionwise, time being allowed for reaction between additions. In so doing, the amount (or concentration) of gas and of chlorin in the mass is not great at any one time while in the aggregate considerable amounts of both are used in connection with a relatively small amount of steam. The advantage of this in economizing heat and space is obvious.

The granular fragmentary mass or layer 16 shown has as stated a mechanical function as promoting admixture of the gases and vapors; and this function is an important one. Good and uniform admixture of materials varying as widely in specific gravity as chlorin, oil gas, steam and chlorhydrin is difficult to secure. If the granules are MnO₂ they superadd a chemical function in removing HCl and converting it into Cl₂; if they are pottery fragments, broken stone, etc., they have what may be called a physical function in removing HCl since their surfaces are covered with a flowing film of hot condensed moisture which takes up HCl without absorbing chlorhydrin. In either event it is advantageous to remove the condensate (which is a solution of MnCl₂ or HCl as the case may be) at a plurality of points along the course of the advancing vapor current to prevent too great concentration. Two points of removal (elements 33) are shown, but more may be provided.

While I regard the particular internal structure of the reaction chamber shown as advantageous for the present purposes, I may of course use other types of tower or reaction chamber provided they are equipped to accomplish my object of adding gas and chlorin in successive small portions to an advancing current of gases and vapors.

In this specification I have more particularly described my process as applied to oil gas made in the manner described; but it may of course be applied to any good oil gas made in other ways; or to any similar gas rich in olefins such as the gas from cracking stills used on petroleum; gases from coal or shale distilled at low temperatures, etc. And as these gases are mainly used as convenient sources of the gaseous olefins, ethylene, propylene and the butylenes, it is obvious that these olefins themselves made in any convenient or suitable manner may be employed in the present process, singly or admixed, without departing from my invention. Ethylene may, for example, be made by partially hydrogenating acetylene with the aid of catalysts, by breaking up alcohol, by fractional separation of liquefied oil gas, etc.

In a modification of my invention using the manganese dioxid, instead of blowing in chlorin with a current of steam, vapors of hydrochloric acid and water are blown in to react upon the manganese dioxid and form chlorin.

In stating the oxidizing function of the manganese dioxide, or the Weldon mud, in the oxidizing chamber, I do not wish to be limited to the theory that the oxidation is entirely confined to the hydrochloric acid since it may extend also to the olefins. Such an oxidation would be attended with neutralization of HCl. The manganese dioxid in addition to its oxidizing functon also has a neutralizing function. Other basic oxids which have no particular oxidizing function in this relation may be substituted for the manganese dioxid, as for instance zinc oxid, magnesia, etc. For example, a suspension of magnesia or zinc oxid may be passed through the apparatus to enutralize the hydrochloric acid. The use of carbonates, such as calcium carbonate, etc. is less advisable for the reason that they dilute the gases with CO₂.

What I claim is:—

1. The process of making chlorhydrins from the gaseous olefins which comprises establishing a flowing current of steam and adding to such current successive portions of chlorin and of gas comprising olefins, time for reactions to take place in such current being afforded between additions.

2. The process of making chlorhydrins from the gaseous olefins which comprises adding chlorin and oil gas to a body of steam and after a time to allow reactions to take place adding a further portion of chlorin and a further portion of oil gas to the body of steam and vapors.

3. The process of making chlorhydrins from the gaseous olefins which comprises establishing a flowing current of steam in a chamber provided with means for absorbing HCl from such current, and adding chlorin and oil gas thereto as successive small portions.

4. The process of making chlorhydrins from the gaseous olefins which comprises establishing a flowing current of steam in a chamber provided with means for absorbing HCl from such current, and adding chlorin and oil gas thereto in alternating portions, there being a plurality of additions of each along the path of such flowing current.

5. The process of making chlorhydrins from the gaseous olefins which comprises establishing a flowing current of steam through a reaction chamber provided with a plurality of spaced layers of granular material and admixing with such current prior to its entrance into each of said layers a portion of chlorin and a portion of oil gas.

6. The process of making chlorhydrins from the gaseous olefins which comprises establishing a flowing current of steam through a reaction chamber provided with a plurality of spaced layers of granular manganese oxid and admixing with such current prior to its entrance into each of said layers a portion of chlorin and a portion of oil gas.

7. The process of making chlorhydrins from oil gas olefins which comprises establishing a flowing current of steam through a reaction chamber provided with a plurality of spaced layers of granular manganese oxid and admixing with such current prior to its entrance into each of said layers a portion of chlorin and a portion of oil gas, condensed liquid being drained off such layers and removed from contact with said current at a plurality of points along the path of the current.

8. Process for the production of chlorine containing bodies which comprises adding to a stream of steam, chlorine and oil gas in a plurality of steps, removing and oxidizing the HCl formed from the zones of reaction and condensing the steam to recover chlorinated bodies.

9. A process for the preparation of halogen hydrins in which the halogen hydrin is caused to accumulate in an aqueous medium owing to the continued interaction of a hypohalogenous acid and an olefinic hydrocarbon.

10. A process for the preparation of halogen hydrins in which the halogen hydrin is caused to accumulate in an aqueous medium owing to the continued interaction of a hypohalogenous acid and an unsaturated hydrocarbon of the ethylene series.

11. A process for the preparation of halogen hydrins in which the halogen hydrin is caused to accumulate in an aqueous medium owing to the continued interaction of a hypohalogenous acid and ethylene.

12. A process for the preparation of chlorhydrins in which the chlorhydrin is caused to accumulate in an aqueous medium owing to the continued interaction of a hypochlorous acid and an olefinic body.

13. A process for the preparation of chlorhydrins in which the chlorhydrin is caused to accumulate in an aqueous medium owing to the continued interaction of a hypochlorous acid and ethylene.

14. Process for the manufacture of halogen hydrins in which the halogen hydrin is accumulated within an aqueous medium by alternately generating hypohalogenous acid within said medium and introducing an olefinic body into said medium.

15. Process for the manufacture of halogen hydrins in which the halogen hydrin is accumulated within an aqueous medium by alternately generating hypohalogenous acid within said medium and introducing an olefinic body in a gaseous form.

16. Process for the manufacture of halogen hydrins in which the halogen hydrin is accumulated within an aqueous medium by alternately generating hypohalogenous acid within said medium and introducing ethylene into said medium.

17. Process for the manufacture of chlorhydrins in which the chlorhydrin is accumulated within an aqueous medium by alternately generating hypochlorous acid within said medium and introducing ethylene into said medium.

18. In the process of preparing halogen hydrins by accumulation thereof within an aqueous medium by continued interaction of hypohalogenous acid and an unsaturated body, the step which consists of adding a basic substance to neutralize the halogen acid formed during the reaction and so to obtain a stronger solution of halogen hydrin.

19. A process for the manufacture of chlorhydrins in which hypochlorous acid and an olefinic body are repeatedly supplied to an aqueous reaction medium until the chlorhydrin has accumulated in solution to a substantial extent.

20. The process of making chlorhydrins, which consists in bringing an unsaturated hydrocarbon in gaseous state into contact with a solution of hypochlorous acid, in the presence of a material capable of reacting with hydrochloric acid but not with hypochlorous acid, leading off the mixture of solutions thus formed, regenerating hypochlorous acid in said mixture of solutions and subjecting said mixture to the action of an unsaturated hydrocarbon in gaseous state.

21. The process of making chlorhydrins, which consists in producing a mixed solution of hypochlorous acid and a salt of a weak acid, which will react with hydrochloric acid but not with hypochlorous acid contacting said solution with an unsaturated hydrocarbon in gaseous state, then contacting the resultant solution with chlorin to regenerate hypochlorous acid therein, treating the resultant mixed solution to form more chlorhydrin therein, and finally recovering the chlorhydrin therefrom.

22. The process of making chlorhydrins, which consists in preparing a mixed solution of hypochlorous acid and a salt of a weak acid, which will react with hydrochloric acid but not with hypochlorous acid contacting an unsaturated hydrocarbon in gaseous state with said mixed solution, whereby chlorhydrin and a soluble chloride are formed, and finally separating the chlorhydrin from the solution containing the soluble chloride.

23. The method of making chlorhydrin, which consists in bringing water in a closed circuit into contact with an opposed stream first of chlorine gas, then of ethylene, and introducing at one point in the circuit a mild neutralizing agent adapted to react with hydrochloric acid, but not with hypochlorous acid formed by the absorption of the aforesaid gases.

In testimony whereof, I affix my signature.

BYRON E. ELDRED.